United States Patent
Emura

(10) Patent No.: US 9,809,258 B2
(45) Date of Patent: Nov. 7, 2017

(54) VEHICLE BODY STRUCTURE

(71) Applicant: HONDA MOTOR CO., LTD., Tokyo (JP)

(72) Inventor: Masahiko Emura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/916,193

(22) PCT Filed: Aug. 1, 2014

(86) PCT No.: PCT/JP2014/070360
§ 371 (c)(1),
(2) Date: Mar. 3, 2016

(87) PCT Pub. No.: WO2015/033714
PCT Pub. Date: Mar. 12, 2015

(65) Prior Publication Data
US 2016/0194034 A1  Jul. 7, 2016

(30) Foreign Application Priority Data
Sep. 3, 2013  (JP) .................................. 2013-182379

(51) Int. Cl.
*B62D 25/02* (2006.01)
*B62D 25/20* (2006.01)
*B62D 25/04* (2006.01)

(52) U.S. Cl.
CPC ....... *B62D 25/2036* (2013.01); *B62D 25/025* (2013.01); *B62D 25/04* (2013.01)

(58) Field of Classification Search
CPC .. B62D 25/025; B62D 25/2036; B62D 25/04; B62D 21/157; B62D 25/02; B62D 25/20; B62D 25/2018
(Continued)

(56) References Cited

U.S. PATENT DOCUMENTS 8,662,575 B2 * 3/2014 Tamura ................ B62D 25/025
                                                    296/209
8,678,481 B2 * 3/2014 Tamura ................ B62D 25/025
                                                    296/193.05
(Continued)

FOREIGN PATENT DOCUMENTS

JP         6-166384         6/1994
JP       2009-202620        9/2009
(Continued)

OTHER PUBLICATIONS

International Search Report dated Sep. 30, 2014, Application No. PCT/JP2014/070360.
(Continued)

*Primary Examiner* — Glenn Dayoan
*Assistant Examiner* — Sunsurraye Westbrook
(74) *Attorney, Agent, or Firm* — Rankin, Hill & Clark LLP

(57) ABSTRACT

A side sill is configured from a side sill outer element comprising an outer upper wall, outer lower wall, an outer side wall, an outer upper flange and an outer lower flange, and from a side sill inner element comprising an inner upper wall, an inner lower wall, an inner side wall, an inner upper flange and an inner lower flange. On the lower end, a pillar has a joint portion held between and joined to the outer upper flange and the inner upper flange, and a first extension part and a second extension part extending from the joint portion into the closed section of the side sill, and includes an extension, the top end of which is joined to the first extension part and/or the second extension part and the bottom end of which is held between and joined to the outer lower flange and the inner lower flange.

8 Claims, 9 Drawing Sheets

(58) Field of Classification Search
USPC .... 296/209, 187.12, 23.03, 187.1, 191, 210, 296/35.1; 280/735, 878; 293/102, 128; 180/68.5
See application file for complete search history.

(56) References Cited

U.S. PATENT DOCUMENTS

| | | | | |
|---|---|---|---|---|
| 8,746,786 | B2 * | 6/2014 | Pohl | B62D 25/025 296/209 |
| 8,888,173 | B2 * | 11/2014 | Nydam | B62D 25/025 296/187.12 |
| 2010/0207426 | A1 | 8/2010 | Tsuruta et al. | |
| 2011/0285175 | A1 | 11/2011 | Imamura | |

FOREIGN PATENT DOCUMENTS

| | | |
|---|---|---|
| JP | 2011-240886 | 12/2011 |
| JP | 2012-035646 | 2/2012 |
| WO | 2009/038088 | 3/2009 |

OTHER PUBLICATIONS

European Search Report dated 4/11/217, 7 pages.
European Search Report dated Apr. 11, 2017, 7 pages.

\* cited by examiner

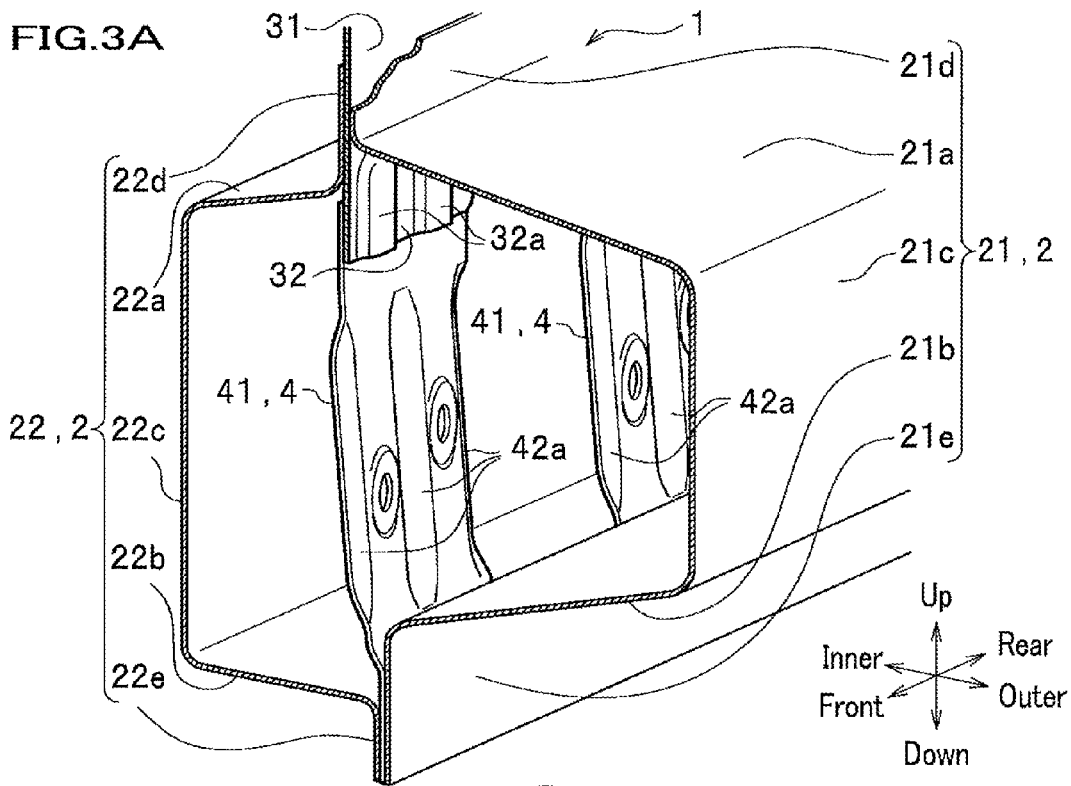
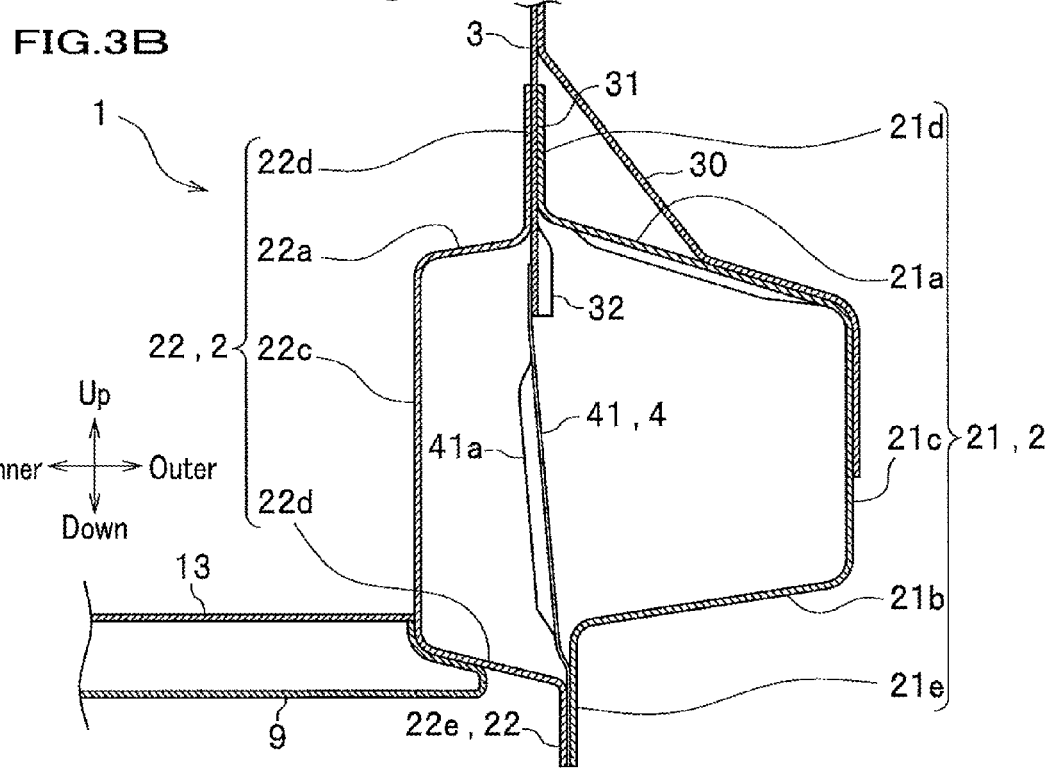

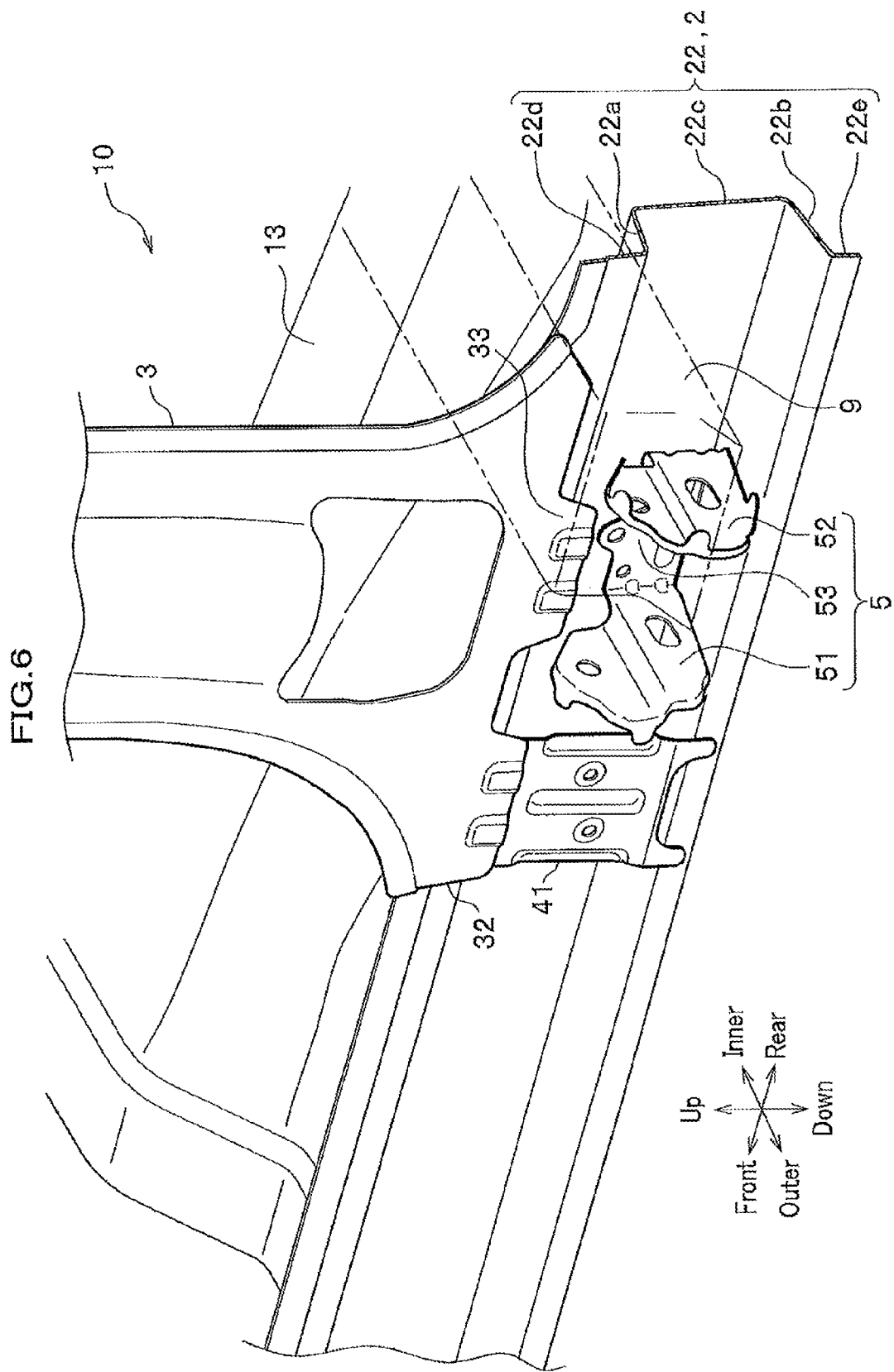

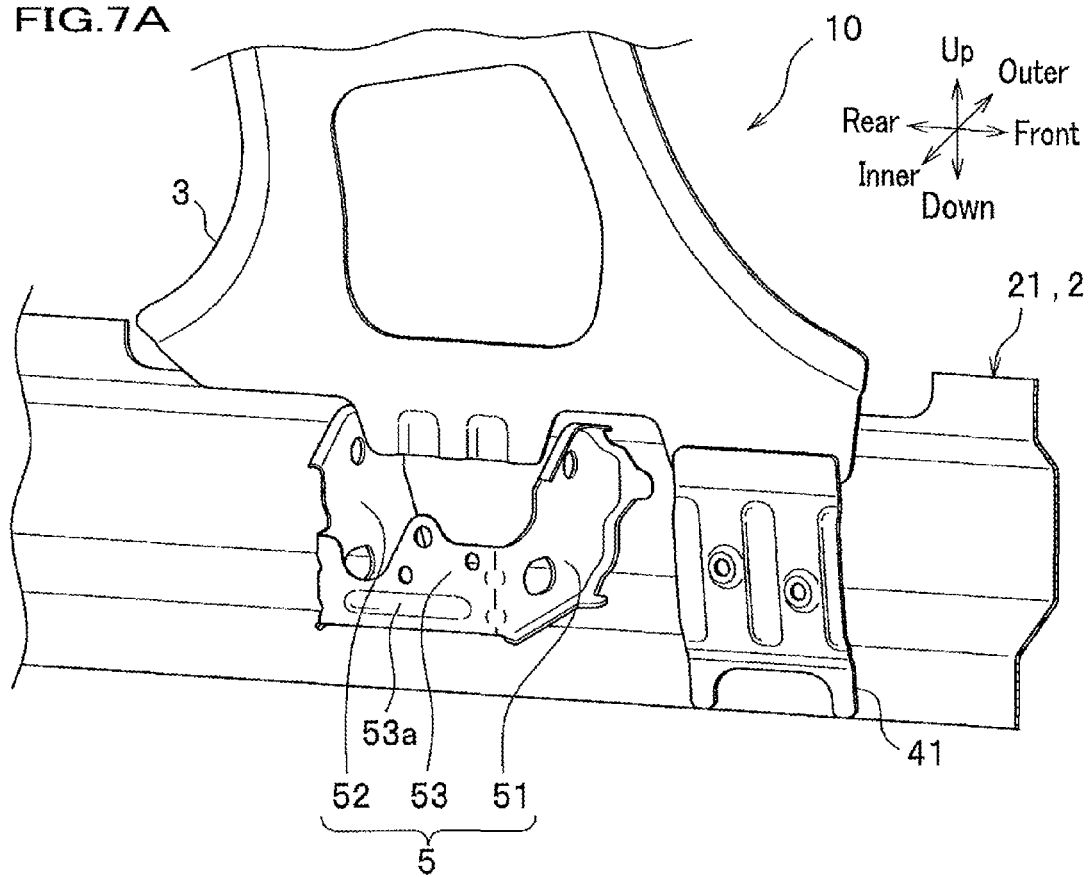
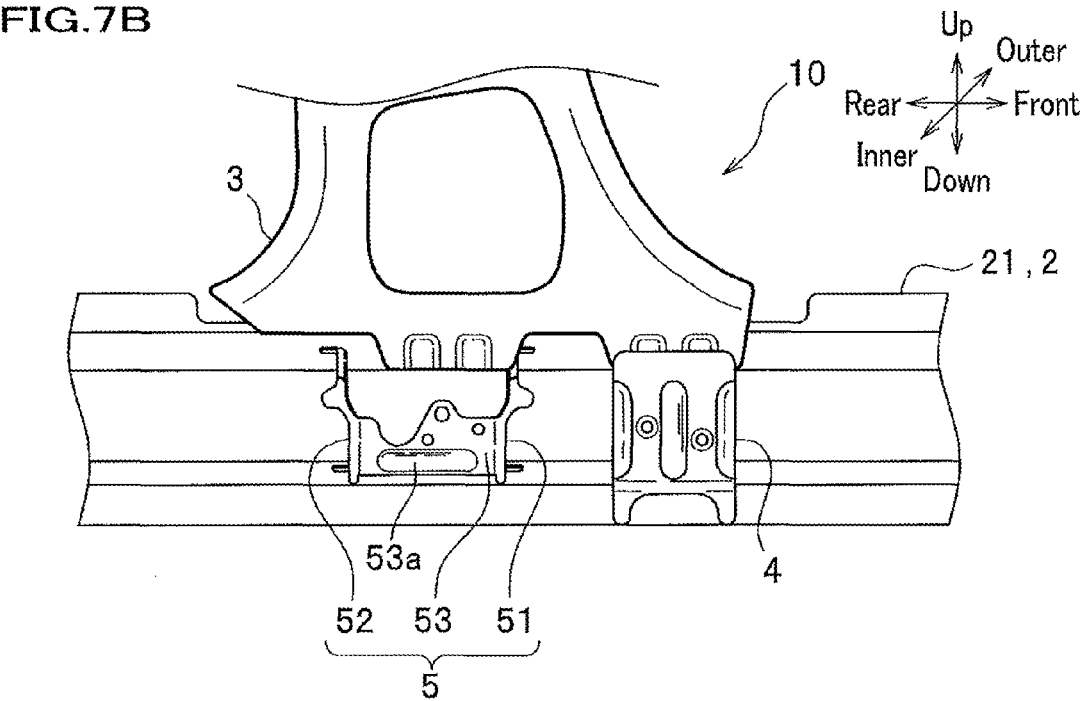

VEHICLE BODY STRUCTURE

TECHNICAL FIELD

The present invention relates to a vehicle-body structure, and in particular to a structure of a vehicle underbody including a junction of a side sill and a pillar.

BACKGROUND ART

In recent years, weight reduction of vehicles as well as vehicle body stiffness has been demanded for overall improvement of drivability, livability, fuel efficiency, and the like. Since the required vehicle body stiffness and strength of the vehicle-body structure are different according to the specifications and destinations of the vehicles, numerous variations adapted for the vehicle specifications and the like are necessary.

Conventionally, a vehicle-body structure in which an extension is arranged in the front-rear direction of the vehicle body to partition off the inside of the side sill (for example, as disclosed in Patent Literature 1) and a vehicle-body structure in which bulkheads are arranged in a side-sill cross section to block up closed cross sections (for example, as disclosed in Patent Literature 2) are known as means for increasing the rigidity of the side sill in the vehicle body.

In the vehicle-body structure disclosed in Patent Literature 1, a lower end portion of a center pillar inner panel 8 is arranged to pass through a side-sill cross section, and overlap with a floor compartment 7 and a side-sill inner 9, and those three parts are joined together.

Thereby, collapse deformation and compression deformation of the side sill in the vertical direction is suppressed, so that the stiffness and the strength of the side sill are increased.

In the vehicle-body structure disclosed in Patent Literature 2, a bulkhead 17 is arranged in the side-sill cross section at the intersection of a side sill 16, a center pillar 32, and a cross member 57.

Thereby, the bulkhead 17 can suppress the sectional deformation and distortion of the side sill 16 to improve the stiffness and the strength of the side sill. In addition, the bulkhead 17 can efficiently transmit a load of a side collision from the center pillar 32 and the side sill 16 through the bulkhead 17 to the cross member 57, and can suppress the amount of deformation of the interior space in the event of a side collision.

CITATION LIST

Patent Literature

Patent Literature 1: Japanese Patent Laid-open No. H06-166384 (1994-166384) (See FIG. 1.)
Patent Literature 2: Japanese Patent Laid-open No. 2011-240886 (See FIG. 2.)

SUMMARY OF INVENTION

Technical Problem

However, in the vehicle-body structure disclosed in Patent Literature 1, in order to partition off the side-sill cross section with the center pillar inner, the lower end portion of the integrally formed center pillar inner is directly joined to the side sill for reinforcement. Therefore, the vehicle-body structure disclosed in Patent Literature 1 cannot be quickly and flexibly adapted for a specification change in the vehicle.

Specifically, in the case where further improvement in the rigidity is required according to the specification or the destination of the vehicle, or in the case where a higher priority is required to be placed on weight reduction or yield than on the rigidity, change in the shape of the center pillar inner per se and preparation of a new forming die corresponding to the specification and the like are necessary. Therefore, the necessity for the change affects short-period development, and causes manufacturing problems including increase in the cost of the forming die and deterioration of the yield.

In the vehicle-body structure disclosed in Patent Literature 2, the bulkhead 17 is arranged in the side-sill cross section. Therefore, the lower end of the center pillar inner cannot be arranged to pass through the side-sill cross section and joined to side-sill cross section as disclosed in Patent Literature 1.

Specifically, the vehicle-body structure disclosed in Patent Literature 2 cannot be suitably adapted for the case where the vehicle-body stiffness of the vehicle-body structure without a bulkhead is insufficient while the specification or the destination of the vehicle does not require so high vehicle-body stiffness as to need addition of a bulkhead (which can ensure high stiffness). That is, it is difficult to realize necessary stiffness and strength with minimum necessary weight increase.

The present invention has been made in view of above, and the object of the present invention is to provide a vehicle-body structure which can ensure, with minimum necessary weight increase, stiffness and strength appropriate for a requirement based on a vehicle specification of or a standard in a destination.

Solution to Problem

In order to solve the aforementioned problem, the invention according to the appended claim 1 provides a vehicle-body structure which includes a side sill extending on a side of a vehicle body in a front-rear direction, and a pillar having a lower end joined to the side sill and extending upward. The invention according to the appended claim 1 is characterized in that the side sill includes a side-sill outer and a side-sill inner; the side-sill outer is formed, to have a hat-like cross section, by a pair of an outer upper wall and an outer lower wall which face each other, an outer side wall which extends to outer ends, in a vehicle-width direction, of the outer upper wall and the outer lower wall, an outer upper flange which extends upward from an inner end, in the vehicle-width direction, of the outer upper wall, and an outer lower flange which extends downward from an inner end, in the vehicle-width direction, of the outer lower wall; the side-sill inner is formed, to have a hat-like cross section, by a pair of an inner upper wall and an inner lower wall which face each other, an inner side wall which extends to inner ends, in the vehicle-width direction, of the inner upper wall and the inner lower wall, an inner upper flange which extends upward from an outer end, in the vehicle-width direction, of the inner upper wall, and an inner lower flange which extends downward from an outer end, in the vehicle-width direction, of the inner lower wall, wherein the outer upper flange and the inner upper flange are joined and the outer lower flange and the inner lower flange are joined so as to form a closed cross section; and the pillar includes a joined portion located in a lower end portion of the pillar, and sandwiched and joined between the outer upper flange and the inner upper flange, a first extended portion and a second extended portion which extend in the closed cross section of the side sill from the joined portion, and are arranged at a predetermined distance from each other in the front-rear direction, and an extension which has an upper end joined to at least one of the first extended portion and the second extended portion, and a lower end sandwiched and joined between the outer lower flange and the inner lower flange.

In the vehicle-body structure according to the present invention, the joined portion which is sandwiched and joined between the outer upper flange and the inner upper flange is arranged in a lower end portion of the pillar. Therefore, predetermined rigidity can be ensured by joining the pillar and the upper portion of the side sill.

In addition, since the first extended portion and the second extended portion which extend in the closed cross section of the side sill from the joined portion is arranged, the extension can be joined to at least one of the first extended portion and the second extended portion. Therefore, when the lower end of the extension is joined to the lower portion of the side sill, the collapse deformation of the side-sill cross section in the vertical direction and the compression deformation of the side sill in the lateral direction can be suppressed, so that stronger rigidity can be ensured.

As explained above, in the vehicle-body structure according to the present invention, the provision of the at least two extended portions enables various types of rigidity designs which are flexibly adapted for requirements of vehicle specifications and standards in destinations. For example, a rigidity design in which the extension is joined to one of the first and second extended portions and is not joined to the other of the first and second extended portions, or a rigidity design realizing higher strength in which one or more extensions are joined to both of the first extended portion and the second extended portion, is enabled when necessary. When necessary, increase in the number of extended portions enables further preferable rigidity with minimum necessary weight increase.

Thus, the vehicle-body structure according to the present invention can endure, with minimum necessary weight increase, vehicle-body performance such as appropriate rigidity and strength.

In addition, in the vehicle-body structure, the extension is formed separately from the pillar inner. Therefore, various types of rigidity designs are enabled by changing the number and shapes of joined extensions without changing the shape of the pillar inner. Further, in the case where the gaps from the lower edges of the first extended portion and the second extended portion are equalized or normalized, the shape of the extension can be standardized. Therefore, the equalization or normalization of the extended portions can desirably contribute to short-time development, increase productivity and yield, and reduce man-hour cost.

The invention according to the appended claim 2 is the vehicle-body structure described in the appended claim 1 which is further characterized in that the upper end of the extension is joined to the first extended portion and the second extended portion.

In the vehicle-body structure according to the present invention, the extension is joined to both of the first extended portion and the second extended portion. Therefore, the rigidity and strength of the vehicle body can be improved in comparison with the case where the extension is joined to one of the first and second extended portions.

Thus, the vehicle-body structure according to the present invention enables rigidity designs which are flexibly adapted for the requirements of vehicle specifications and the standards in destinations, and ensures appropriate rigidity and strength with minimum necessary weight increase.

The invention according to the appended claim 3 is the vehicle-body structure described in the appended claim 1 which is further characterized in that the extension is joined to one of the first extended portion and the second extended portion, and is not joined to the other of the first extended portion and the second extended portion, and a bulkhead is arranged below the pillar to block the closed cross section; and the bulkhead is arranged to be joined to the side-sill outer and extend inward close to the side-sill inner in the vehicle-width direction.

In the vehicle-body structure according to the present invention, the extension is joined to one of the extended portions, and is not joined to the other of the extended portions, and the bulkhead is arranged below the pillar. Therefore, the rigidity and the load transmission characteristic of the vehicle body in the vehicle-width direction can be improved in comparison with the case where the extension is joined to both of the first extended portion and the second extended portion.

In addition, since the outside of the bulkhead is joined to the side-sill outer, when a collision load is inputted, the load can be quickly transmitted from the bulkhead to the side-sill inner, and from the side-sill inner to a vehicle-body floor or a cross member. Therefore, the collision performance can be improved.

On the other hand, since the inside of the bulkhead is arranged to be close to the side-sill inner, transmission of vibrations of the vehicle body from the side-sill inner to the vehicle-body floor can be avoided during vehicle running. Therefore, habitability and running stability can be improved.

As explained above, the vehicle-body structure according to the present invention enables rigidity designs which are flexibly adapted for the requirements of vehicle specifications and standards in destinations, ensures appropriate rigidity and strength with minimum necessary weight increase, and enables overall improvement of drivability, livability, fuel efficiency, and collision performance such as the load transmission performance.

The invention according to the appended claim 4 is the vehicle-body structure described in the appended claim 3 which is further characterized in that the bulkhead is arranged in a position below and overlapping the other of the first extended portion and the second extended portion, and formed, to have a U-shaped cross section, by a pair of a bulk front wall and a bulk rear wall facing each other and a bulk side wall extending to inner ends of the bulk front wall and the bulk rear wall; the bulk front wall includes a bulk-front-wall lower portion extending to the bulk side wall, a forward-bent portion extending upward from the bulk-front-wall lower portion and being bent forward, and a bulk-front-wall upper portion extending upward from the forward-bent portion; the bulk rear wall includes a bulk-rear-wall lower portion extending to the bulk side wall, a rearward-bent portion extending upward from the bulk-rear-wall lower portion and being bent rearward, and a bulk-rear-wall upper portion extending upward from the rearward-bent portion; and the distance between the bulk-front-wall upper portion and the bulk-rear-wall upper portion is greater than the distance between the bulk-front-wall lower portion and the bulk-rear-wall lower portion.

In the vehicle-body structure according to the present invention, since the bulkhead includes the forward-bent portion and the rearward-bent portion, ridge lines on convex shapes extending in the vehicle-width direction are formed. Therefore, the yield strength against the load in the vehicle-width direction increases, and the collision performance such as the load transmission performance can be improved.

In addition, the distance between the bulk-front-wall upper portion and the bulk-rear-wall upper portion can be arranged to be greater than the distance between the bulk-front-wall lower portion and the bulk-rear-wall lower portion (i.e., the span in the front-rear direction of the vehicle body). Therefore, the above arrangement of the bulk-front-wall upper portion and the bulk-rear-wall upper portion can contribute to size reduction of the bulkhead while avoiding interference with second extended portion near which the bulkhead is arranged.

The invention according to the appended claim 5 is the vehicle-body structure described in the appended claim 3 which is further characterized in that the bulkhead includes an upper joined portion which is joined to the outer upper wall, a lower joined portion which is joined to the outer lower wall, and a side joined portion which is joined to the outer side wall.

In the vehicle-body structure according to the present invention, the bulkhead is joined to the side-sill outer at the three positions of the upper joined portion, the lower joined portion, and the side joined portion. Therefore, the deformation of the side-sill cross section in the vertical and lateral directions and the torsional deformation of the cross section can be suppressed, and the section stiffness and strength of the side sill can be improved.

The invention according to the appended claim 6 is the vehicle-body structure described in the appended claim 4 which is further characterized in that the bulkhead includes a bead which extends on the bulk side wall along the front-rear direction of the vehicle body.

Because of the provision of the bead in the bulk side wall, the yield strength against compressive or tensile deformation of the bulk side wall in the front-rear direction and the bending stiffness of the bulk side wall in the vehicle-width direction are increased. Therefore, it is possible to suppress the vehicle-width direction movement of the inner ends, in the vehicle-width direction, of the bulk front wall and the bulk rear wall, at which the bulk front wall and the bulk rear wall continue to the bulk side wall, and prevent slanting deformation of the bulk front wall and the bulk rear wall.

Thus, a load inputted at the time of a side collision can be transmitted, with high reliability, through the bulk front wall and the bulk rear wall to the side-sill inner and the vehicle-body floor, so that the collision performance such as the load transmission performance can be improved.

The invention according to the appended claim 7 is the vehicle-body structure described in the appended claim 3 which is further characterized in that the bulkhead is arranged to overlap with a cross member in a vehicle-width direction position, where the cross member supports a vehicle-body floor and extends in the vehicle-width direction.

In the vehicle-body structure according to the present invention, because the bulkhead is arranged to overlap with the cross member in a vehicle-width direction position, a load inputted on a side face of the vehicle body can be transmitted, with high reliability, from the side-sill outer through the bulkhead and the side-sill inner to the cross member, and can be further transmitted through the cross member to the other side face of the vehicle body in a dispersed manner. Therefore, the collision performance such as the load transmission performance and the load dispersion performance can be further improved.

Advantageous Effect of Invention

The vehicle-body structure according to the present invention can ensure, with minimum necessary weight increase, stiffness and strength appropriate for a requirement based on a vehicle specification of or a standard in a destination.

BRIEF DESCRIPTION OF THE DRAWINGS

FIGS. 3A and 3B illustrate the extension according to the first embodiment of the present invention, where FIG. 3A is a partially-magnified view, and FIG. 3B is a cross sectional view of the side sill.

FIG. 4A illustrates extended portions of a pillar inner to which the extensions are to be joined, and FIG. 4B is a view, from outside, of a situation in which the extensions are joined to the extended portions, and a side-sill outer is removed for illustration.

FIG. 5A is a view from inside in which a side-sill inner is removed for illustration, and FIG. 5B illustrates a variation in which an extension is joined to a first extended portion only.

FIG. 6 is a perspective view illustrating a situation of attachment of a bulkhead in a vehicle-body structure according to a second embodiment of the present invention, specifically, a view, from rear left, of a lower portion of the pillar inner in which the side-sill outer is removed for illustration.

FIGS. 7A and 7B illustrates a situation of attachment of the bulkhead in the vehicle-body structure according to the second embodiment of the present invention, where FIG. 7A is a perspective view from the inner front side in which a side-sill inner is removed for illustration, and FIG. 7B is a front view.

FIG. 8A is a cross-sectional view of a side sill, which is presented for explaining a situation of a junction, and FIG. 8B is a perspective view illustrating an external appearance of the structure of the bulkhead and a bead.

FIG. 9A illustrates a variation in which two extended portions are contiguously arranged, and FIG. 9B illustrates a variation in which an extension is joined to two extended portions.

DESCRIPTION OF EMBODIMENT

Hereinbelow, a vehicle-body structure 1 in a vehicle (not shown) according to the first embodiment of the present invention is explained in detail with reference to FIGS. 1 to 5 as needed. Although the type of the vehicle is not specifically limited, for convenience of explanation, the front-rear direction, the up-down direction, and the vehicle-width direction (lateral direction) are referred to based on the direction of the vehicle, the interior side of the vehicle is referred to the inner side, and the exterior side of the vehicle is referred to the outer side.

Figure 1:
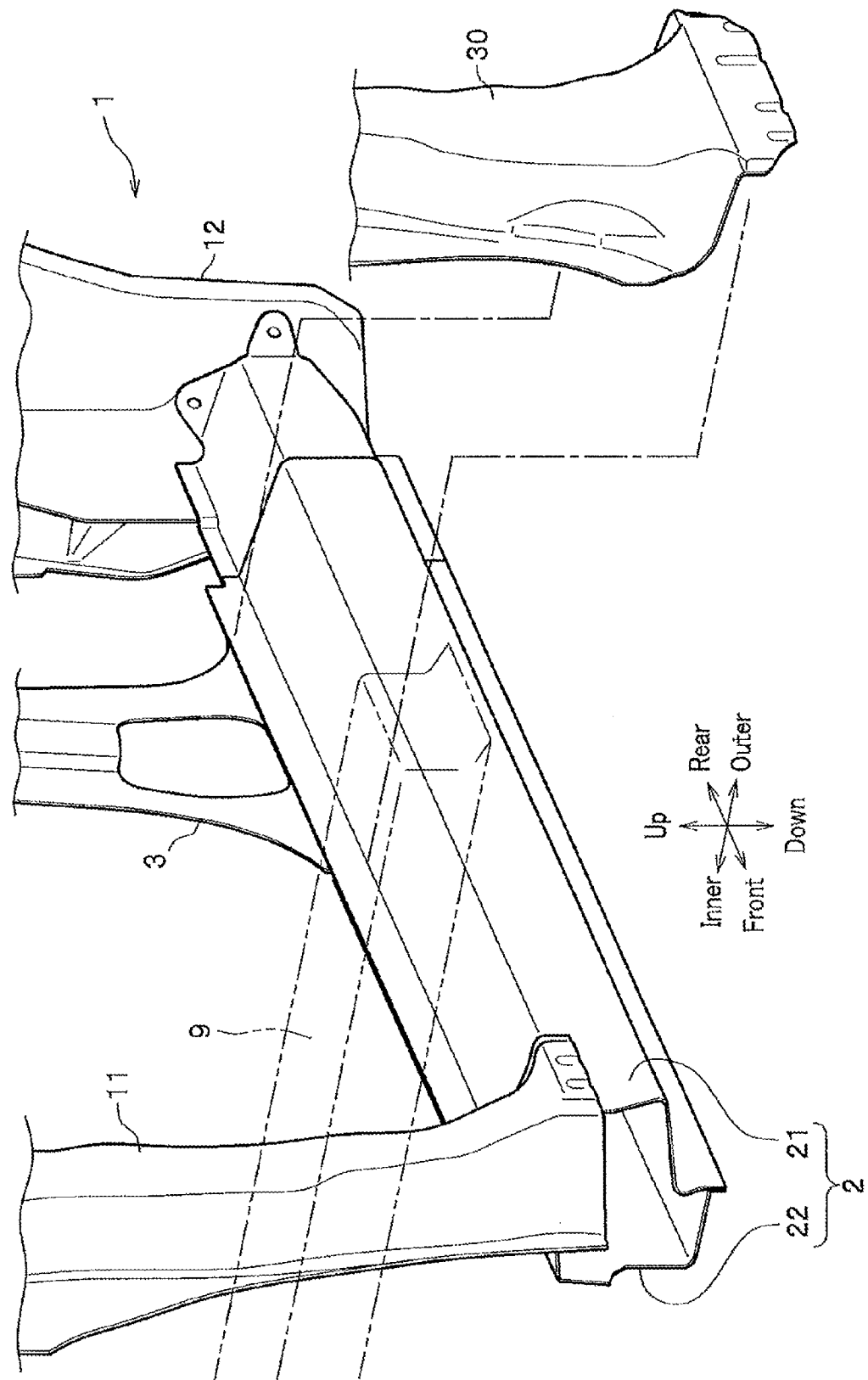
FIG. 1 is an exploded perspective view illustrating an appearance, around a side sill, of a vehicle-body structure according to a first embodiment of the present invention.

FIG. 1 is a perspective view, from outer front, of the left side of the vehicle, and illustrates the vehicle-body structure in the extent from a front pillar 11 to a rear wheelhouse 12.

Figure 2:
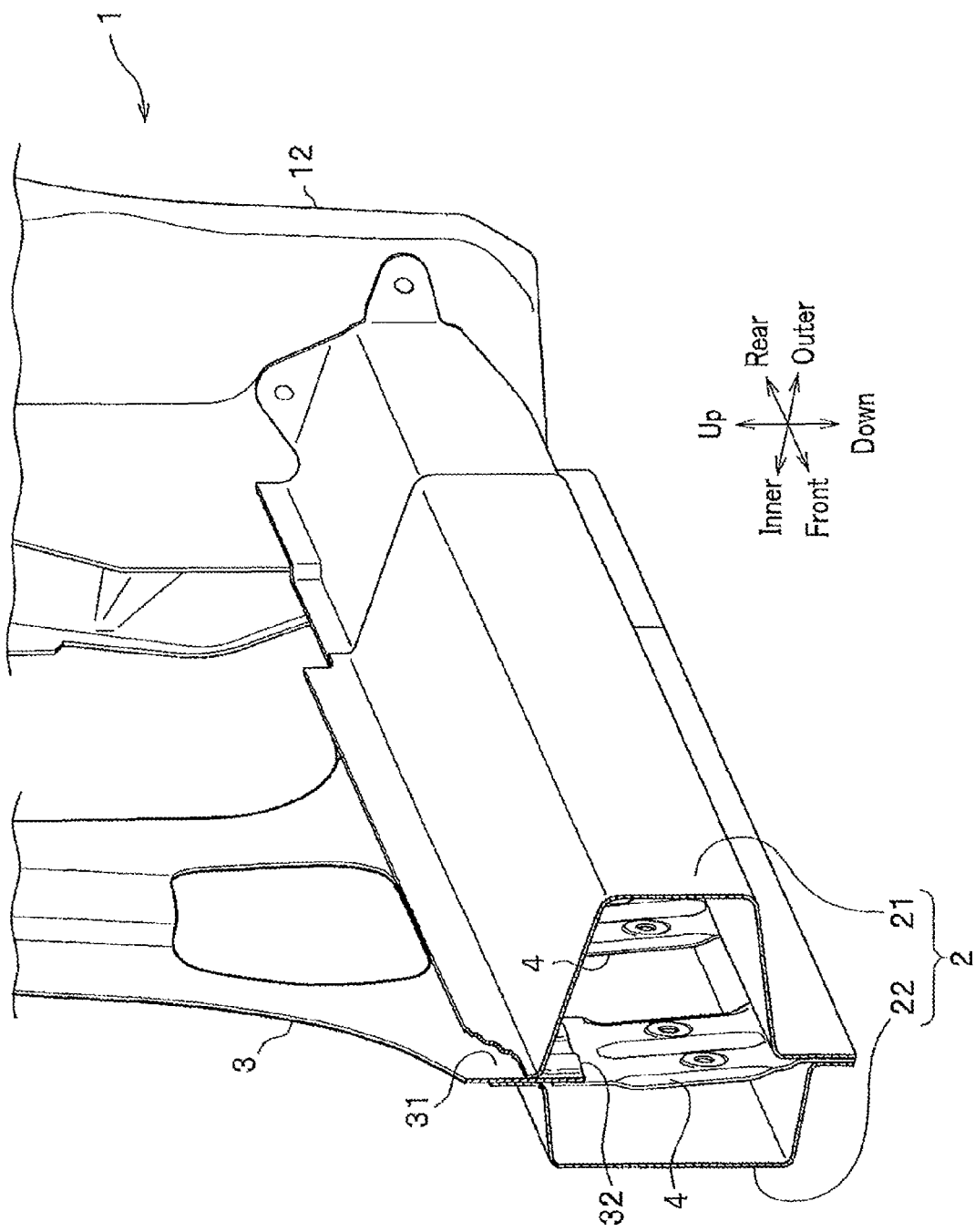
FIG. 2 is a partially-cutaway, partially-magnified perspective view illustrating an extension in the vehicle-body structure according to the first embodiment of the present invention, where the side sill is cut at an edge portion of a center pillar illustrated in FIG. 1 for illustration.

As illustrated in FIG. 1, the vehicle-body structure 1 includes a side sill 2, a center pillar inner 3, one or more extensions 4, and a cross member 9. The side sill 2, which is arranged on each side of the vehicle, extends in the front-rear direction. The center pillar inner 3 is a pillar which extends upward and the lower end portion of which is joined to the side sill 2. The one or more extensions 4 (as illustrated in FIG. 2) are joined to the lower end of the center pillar inner 3. The cross member 9 is joined to the side sill 2, and extends in the vehicle-width direction.

Although the following explanations are presented for the left side of the vehicle, the vehicle-body structure includes a pair of side sills on right and left sides, and the right side of the vehicle may also have a similar structure. In addition, although the center pillar (the center pillar inner 3) is taken as an example of the pillar, the front pillar 11 or a rear pillar (not shown) may also have a similar structure. Hereinafter, the center pillar inner is abbreviated as the pillar inner 3. In addition, a pillar stiffener 30 is joined to the pillar inner 3 for reinforcement, and outer panels (not shown) such as body-side panels are joined. However, since the present invention is not limited by the pillar stiffener 30 and the outer panels, the pillar stiffener 30 and the outer panels are not explained in detail.

As illustrated in FIG. 2, the side sill 2 includes a side-sill outer 21 and a side-sill inner 22. The side-sill outer 21 is arranged to project outward by a large distance, and the side-sill inner 22 is arranged to project inward by a small distance. The side-sill outer 21 and the side-sill inner 22 are joined to form a closed cross section, by a means for welding such as spot welding at flange portions which are arranged in upper portions and lower portions of the side-sill outer 21 and the side-sill inner 22.

As illustrated in FIGS. 3A and 3B, the side sill outer 21 includes a pair of an outer upper wall 21a and an outer lower wall 21b, an outer side wall 21c, an outer upper flange 21d, and an outer lower flange 21e. The outer upper wall 21a and the outer lower wall 21b face each other. The outer side wall 21c extends to the outer end, in the vehicle-width direction, of the outer upper wall 21a, and also to the outer end, in the vehicle-width direction, of the outer lower wall 21b. The outer upper flange 21d extends upward from the inner end, in the vehicle-width direction, of the outer upper wall 21a. The outer lower flange 21e extends downward from the inner end, in the vehicle-width direction, of the outer lower wall 21b.

The side-sill outer 21 is formed to have a cross section with a hat-like shape, and arranged in such an orientation that the outer upper flange 21d and the outer lower flange 21e are located inside, and the outer side wall 21c projects outward.

The side-sill inner 22 includes a pair of an inner upper wall 22a and an inner lower wall 22b, an inner side wall 22c, an inner upper flange 22d, and an inner lower flange 22e. The inner upper wall 22a and the inner lower wall 22b face each other. The inner side wall 22c extends to the inner end, in the vehicle-width direction, of the inner upper wall 22a, and also to the inner end, in the vehicle-width direction, of the inner lower walls 22b. The inner upper flange 22d extends upward from the outer end, in the vehicle-width direction, of the inner upper wall 22a. The inner lower flange 22e extends downward from the outer end, in the vehicle-width direction, of the inner lower walls 22b.

The side-sill inner 22 is formed to have a cross section with a hat-like shape, and arranged in such an orientation that the inner upper flange 22d and the inner lower flange 22e are located inside, and the inner side wall 22c projects inward.

In the upper portion of the side sill 2, the pillar inner 3 is inserted between the outer upper flange 21d of the side-sill outer 21 and the inner upper flange 22d of the side-sill inner 22, and the side-sill outer 21, the pillar inner 3, and the side-sill inner 22 are integrally joined.

In the lower portion of the side sill 2, the one or more extensions 4 are inserted between the outer lower flange 21e of the side-sill outer 21 and the inner lower flange 22e of the side-sill inner 22, and the side-sill outer 21, the one or more extensions 4, and the side-sill inner 22 are integrally joined.

Figure 4A:
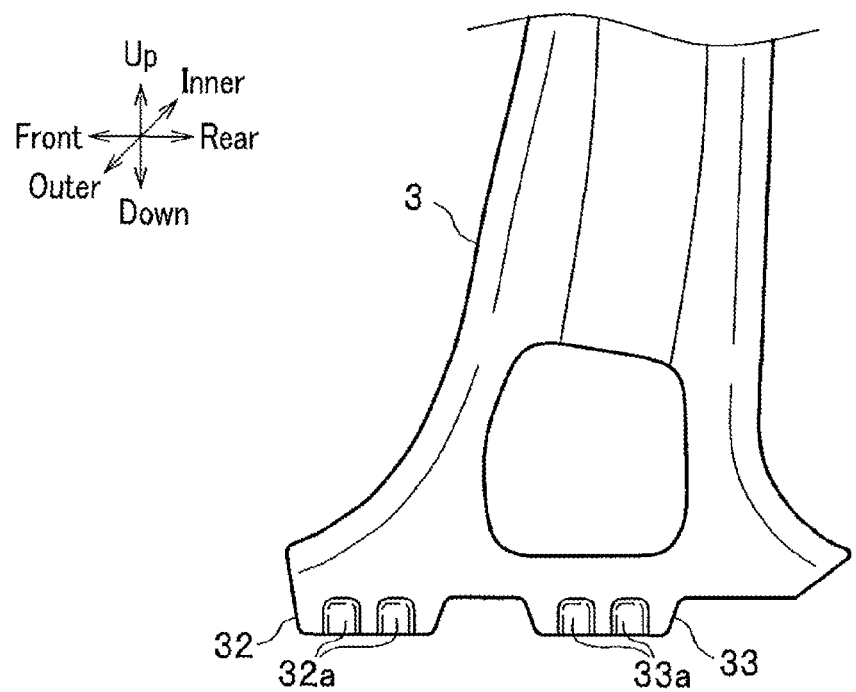
FIGS. 4A and 4B are front views presented for explaining a situation of a junction of the extension according to the first embodiment of the present invention, where
Figure 4B:
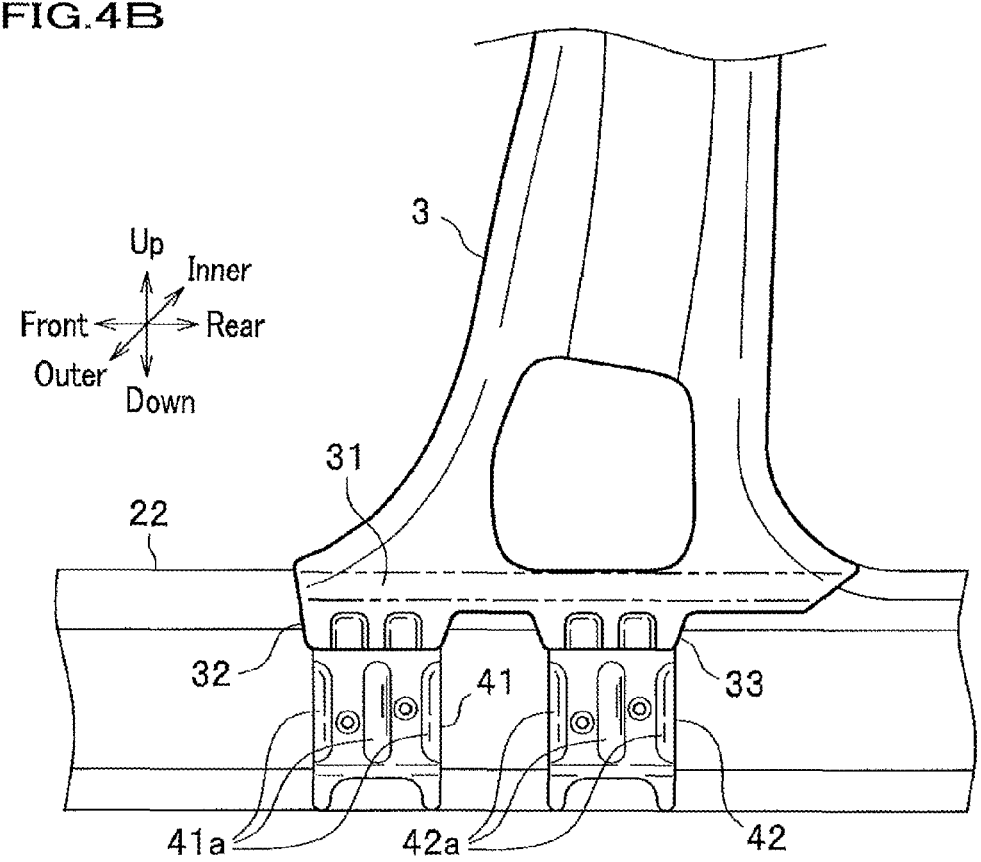

As illustrated in FIG. 2, the pillar inner 3 is formed to have such a shape that a lower end portion which is to be joined to the side sill 2 is widened and the width of the pillar inner 3 is narrowed upward (as illustrated in FIGS. 4A and 4B). The skirt portion in the widened lower end portion is formed to be more widened on the front side than on the rear side (as illustrated in FIG. 4A).

As illustrated in FIGS. 3 and 4, the pillar inner 3 includes a joined portion 31 and first and second extended portions 32 and 33. The joined portion 31 is sandwiched between the outer upper flange 21d and the inner upper flange 22d, and joined (as illustrated in FIG. 4B). The first and second extended portions 32 and 33 are arranged to extend inside the closed cross section of the side sill 2 from the joined portion 31.

The first extended portion 32 is arranged on the front side of the lower end portion of the pillar inner 3. In order to increase the rigidity, boss portions 32a which project outward and have convex shapes with ridge lines along the vertical direction are formed in the first extended portion 32. The boss portions 32a are formed to be arrayed parallel (for example, in two lines) in the front-rear direction across the entire width of the first extended portion 32.

The second extended portion 33 is arranged in an approximately middle portion of the lower end portion of the pillar inner 3 at a predetermined distance from the first extended portion 32 in the front-rear direction. Since the second extended portion 33 has the same shape as the first extended portion 32, the second extended portion 33 is not explained in detail.

In addition, although the first and second extended portions 32 and 33 are arranged in two positions, alternatively, it is possible to arrange three or more extended portions as needed in consideration of the width and the like of the pillar inner 3. Further, the first and second extended portions 32 and 33 may be contiguously arranged.

The one or more extensions 4 includes first and second extensions 41 and 42. The first extension 41 is joined to a lower end portion of the first extended portion 32, and the second extension 42 is joined to a lower end portion of the second extended portion 33. The lengths and widths of the first and second extensions 41 and 42 are set to be predetermined shapes and sizes which are identical to the shapes and sizes of the first and second extended portions 32 and 33.

Consolidation of the shape and size of the extensions 4 into a predetermined standard can desirably contribute to short-time development, increase productivity and yield, and reduce cost.

Figure 5A:
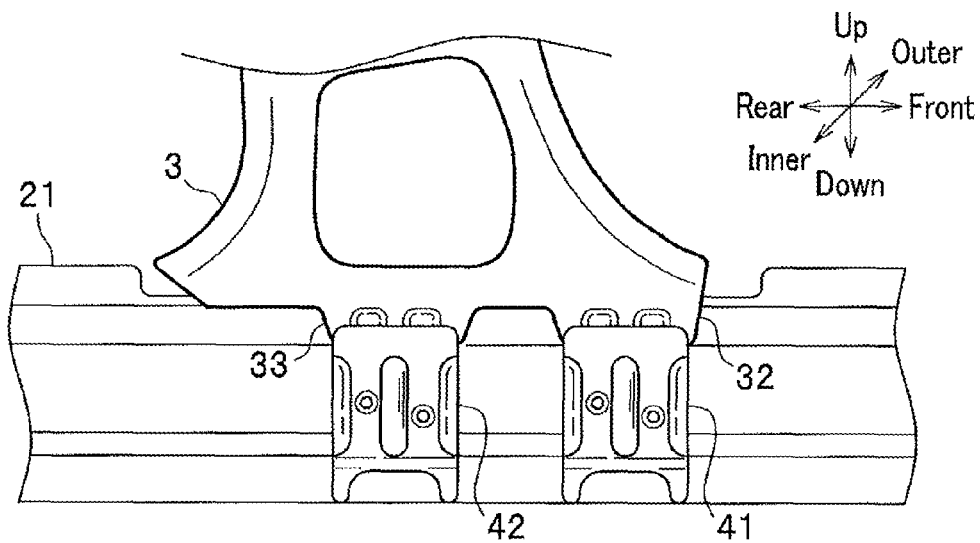
FIGS. 5A and 5B are front views presented for explaining a situation of a junction of the extensions according to the first embodiment of the present invention, where

As illustrated in FIGS. 3A and 3B, the first extension 41 has the shape of a rectangular plate. The upper edge portion of the first extension 41 is joined to the inside of the first extended portion 32 (as illustrated in FIG. 5A), and the lower edge portion of the first extension 41 is joined between the outer lower flange 21e and the inner lower flange 22e.

The first extension 41 is arranged to partition off the closed cross section formed in the side sill 2, along the vertical direction, and exercises functions of suppressing collapse deformation of the side sill 2 in the vertical direction and compression deformation of the side sill 2 in the vehicle-width direction, and increasing the section stiffness and the strength of the side sill 2.

In order to further increase the rigidity, beads 41a which project inward and have convex shapes with ridge lines along the vertical direction are formed in the first extension 41 (as illustrated in FIG. 3B). The beads 41a are formed to be arrayed parallel (for example, in three lines) in the front-rear direction across the entire width of the first extended portion 32.

The upper edge portion of the second extension 42 is joined to the inside of the second extended portion 33, and the lower edge portion of the second extension 42 is joined between the outer lower flange 21e and the inner lower flange 22e. Since the second extension 42 has the same structure as the first extension 41, the second extension 42 is not explained in detail.

Figure 5B:
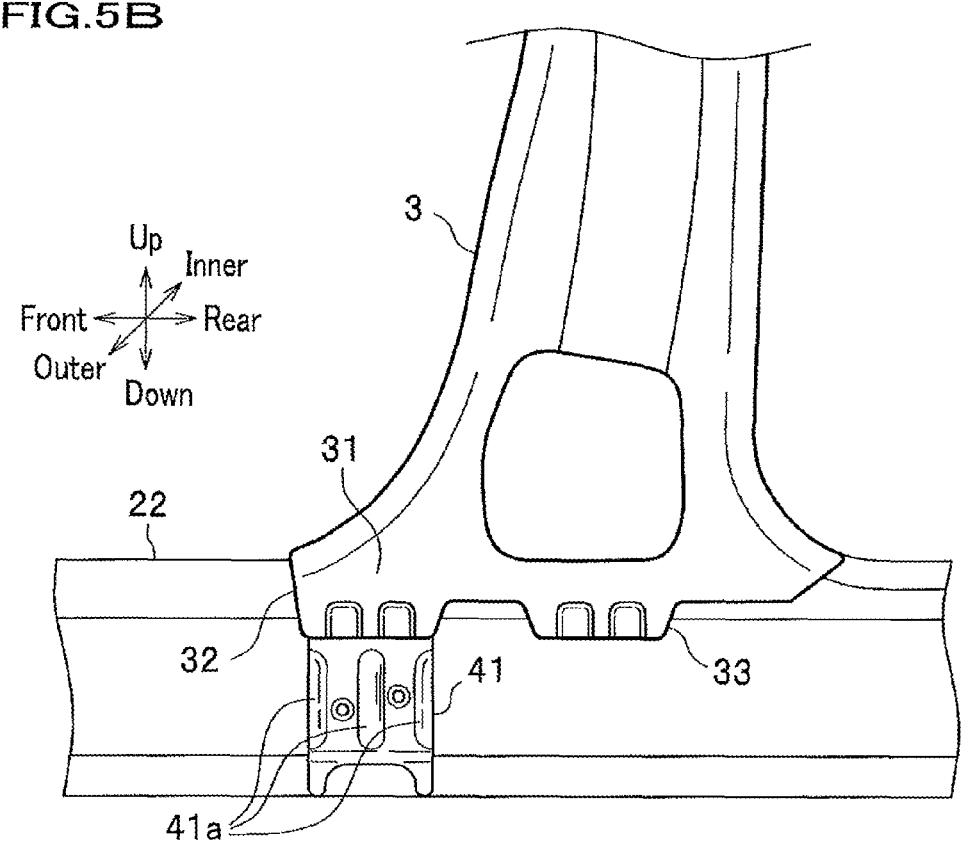

In the vehicle-body structure 1 according to the first embodiment, the first extension 41 and the second extension 42 are respectively joined to the first extension 32 and the second extension 33. Alternatively, as illustrated in FIG. 5B, the first extension 41 and the second extension 42 may be joined to only one of the first extended portion 32 and the second extended portion 33 according to the requirement of the vehicle specification or the standard in the destination.

In the vehicle-body structure 1 having the structure as above, the provision of the at least two extended portions 32 and 33 enables various types of rigidity designs which can be flexibly adapted for the requirements of vehicle specifications and standards in destinations. For example, when necessary, the vehicle-body structure 1 allows a rigidity design in which an extension 4 is joined to one of the first extended portion 32 and the second extended portion 33 and no extension is arranged for the other of the first extended portion 32 and the second extended portion 33, or a rigidity design realizing higher strength in which one or more extensions are joined to both of the first extended portion 32 and the second extended portion 33. When necessary, further preferable rigidity designs with minimum necessary weight increase are enabled by increasing the number of extended portions 32 and 33.

In addition, in the vehicle-body structure 1, the extensions 4 are formed separately from the pillar inner 3. Therefore, various types of rigidity designs are enabled by the number and shapes of joined extensions 4 without changing the shape of the pillar inner 3. Further, in the case where the gaps from the lower edges of the first extended portion 32 and the second extended portion 33 are equalized or normalized, the shapes of the extensions 4 can be standardized. Therefore, the vehicle-body structure 1 can desirably contribute to short-time development, increase productivity and yield, and reduce man-hour cost.

Next, a vehicle-body structure 10 according to the second embodiment of the present invention is explained with reference to FIGS. 6 to 8. FIG. 6 is a perspective view, from rear left, of a lower portion of a pillar inner, where a side-sill outer is removed for illustration. FIG. 7A is a perspective view from the inner front side, where a side-sill inner is removed for illustration. FIG. 7B is a front view.

As illustrated in FIG. 6, the vehicle-body structure 10 according to the second embodiment includes the extension 41 and a bulkhead 5. The extension 41 is joined to the first extended portion 32 as one of the first extended portion 32 and the second extended portion 33. The bulkhead 5 is arranged in a position below and overlapping the second extended portion 33 as the other of the first extended portion 32 and the second extended portion 33.

The vehicle-body structure 10 is different from the vehicle-body structure 1 according to the first embodiment mainly in that the bulkhead 5 is arranged. Since the vehicle-body structure 10 is similar to the vehicle-body structure 1 except for the arrangement of the bulkhead 5, the same structural elements as the first embodiment respectively bear the same reference numbers as the first embodiment, and explanations on the same structural elements are not repeated.

The bulkhead 5 is constituted by a bulk front wall 51, a bulk rear wall 52, and a bulk side wall 53 so as to have a U-shaped cross section and reduced weight. The bulk front wall 51 and the bulk rear wall 52 form a pair, and face each other in the front-rear direction. The bulk side wall 53 extends to the inner end portion of the bulk front wall 51 and to the inner end portion of the bulk rear wall 52.

Figure 8A:
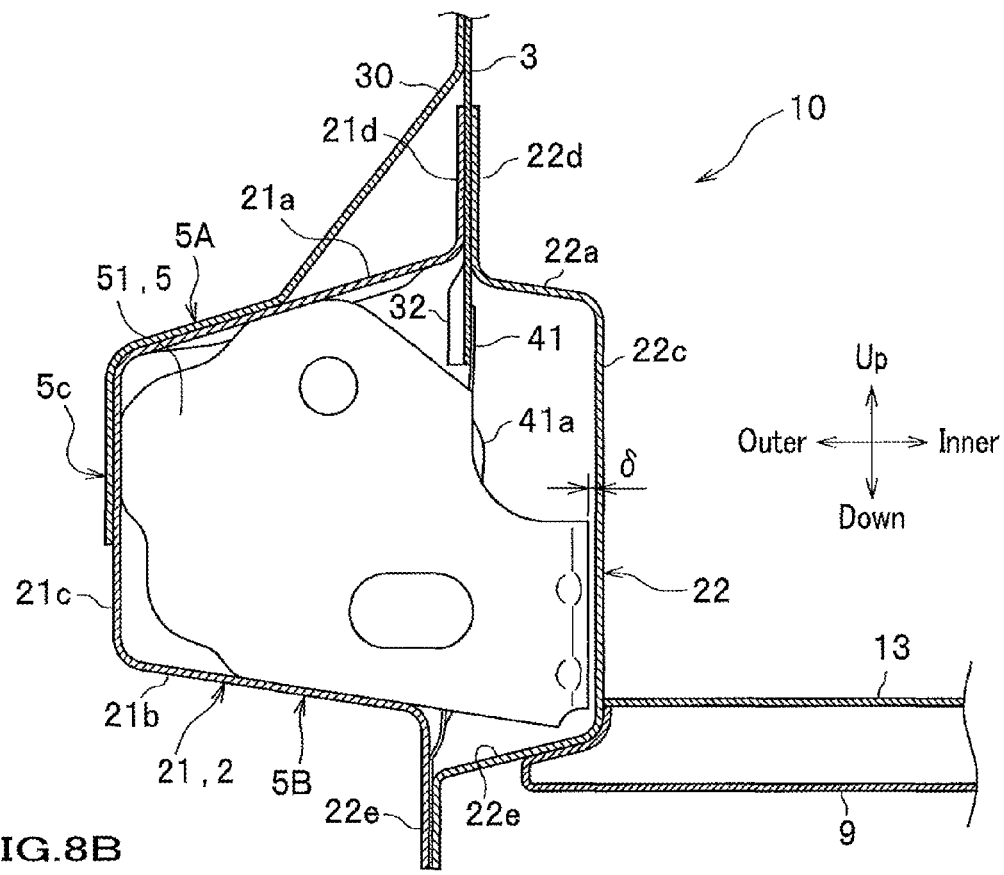
FIGS. 8A and 8B illustrate the bulkhead in the vehicle-body structure according to the second embodiment of the present invention, where

As illustrated in FIG. 8A, the bulkhead 5 is arranged to block the closed cross section in the side sill 2, and held by being joined to the side-sill outer 21. The bulkhead 5 is arranged such that the bulk side wall 53 is close to the side-sill inner 22, and a gap $\delta$ exists between the side-sill inner 22 and the bulk side wall 53.

The bulkhead 5 is joined to the side-sill outer 21 by a means for welding such as spot welding at three positions of an upper joined portion 5A, a lower joined portion 5B, and a side joined portion 5C. Specifically, the bulkhead 5 is joined to the outer upper wall 21a at the upper joined portion 5A, to the outer lower wall 21b at the lower joined portion 5B, and to the outer side wall 21c at the side joined portion 5C.

Figure 8B:
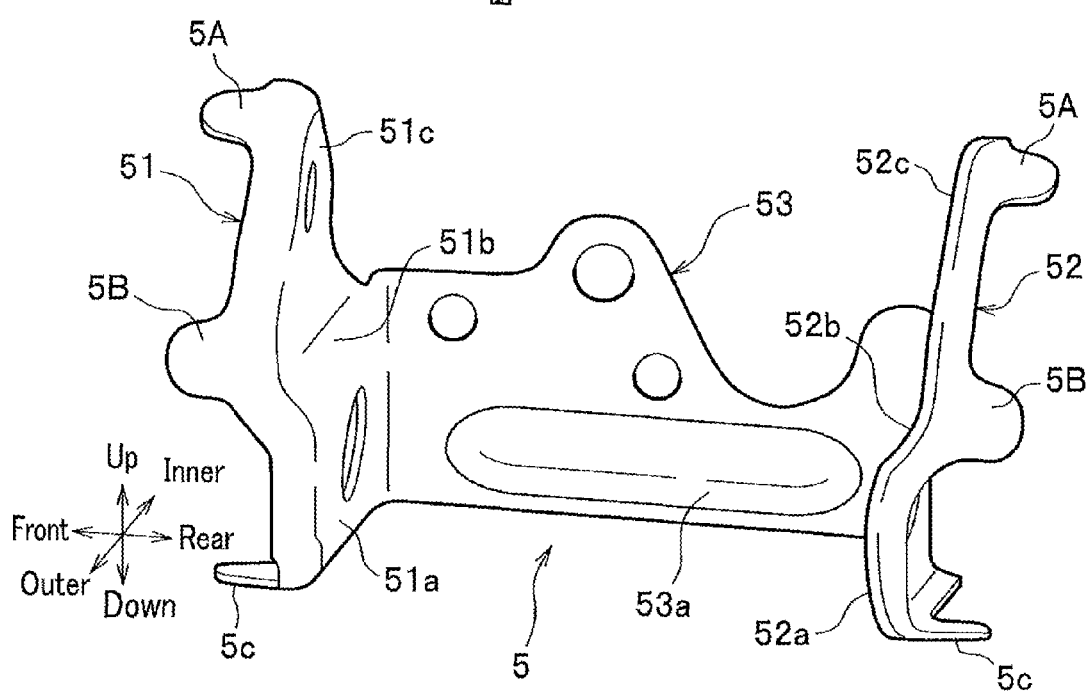

As illustrated in FIG. 8B, the bulk front wall 51 includes a bulk-front-wall lower portion 51a, a forward-bent portion 51b, and a bulk-front-wall upper portion 51c. The bulk-front-wall lower portion 51a extends to the bulk side wall 53. The forward-bent portion 51b extends upward from the bulk-front-wall lower portion 51a and is bent forward. The bulk-front-wall upper portion 51c extends upward from the forward-bent portion 51b.

In the above structure, the bulk front wall 51 has ridge lines, extending in the vehicle-width direction, of convex shapes due to the forward-bent portion 51b. Therefore, the yield strength against the load in the vehicle-width direction increases, and the collision performance such as the transmission performance of the collision load can be improved.

The bulk rear wall 52 includes a bulk-rear-wall lower portion 52a, a rearward-bent portion 52b, and a bulk-rear-wall upper portion 52c. The bulk-rear-wall lower portion 52a extends to the bulk side wall 53. The rearward-bent portion 52b extends upward from the bulk-rear-wall lower portion 52a and is bent rearward. The bulk-rear-wall upper portion 52c extends upward from the rearward-bent portion 52b.

The bulk rear wall 52 is bilaterally symmetric with the bulk front wall 51. However, since the bulk rear wall 52 has a similar structure to the bulk front wall 51, the structure of the bulk rear wall 52 is not explained in detail.

In addition, because of the provision of the forward-bent portion 51b and the rearward-bent portion 52b, the distance between the bulk-front-wall upper portion 51c and the bulk-rear-wall upper portion 52c is greater than the distance between the bulk-front-wall lower portion 51a and the bulk-rear-wall lower portion 52a (i.e., the span in the front-rear direction of the vehicle body).

Therefore, the forward-bent portion 51b and the rearward-bent portion 52b can contribute to size reduction of the bulkhead 5 while avoiding interference of the bulkhead 5 with the second extended portion 33, below which the bulkhead 5 is arranged.

In order to further increase the rigidity, the bulk side wall 53 includes a bead 53a, which extends along the front-rear direction of the vehicle. The bead 53a projects outward and has a convex shape.

Because of the provision of the bead 53a in the bulk side wall 53, the rigidity of the bulk side wall 53 increases, and therefore slanting deformation of the bulk front wall 51 and the bulk rear wall 52 can be suppressed. In addition, since the bulk front wall 51 and the bulk rear wall 52 are integrally connected through the bulk side wall 53, the torsional rigidity of the bulk front wall 51 and the bulk rear wall 52 can be increased, and deformation of the side sill 2 can be suppressed.

As illustrated in FIG. 6 and FIG. 8A, the bulkhead 5 is arranged in a vehicle-width direction position which overlaps the vehicle-width direction position of the cross member 9, where the cross member 9 supports the vehicle-body floor 13 and extends in the vehicle-width direction.

In the above structure, a load inputted on a side face of the vehicle body can be transmitted, with high reliability, from the side-sill outer 21 through the bulkhead 5 and the side-sill inner 22 to the cross member 9, and can be further transmitted through the cross member 9 to the other side face of the vehicle body in a dispersed manner. Therefore, the collision performance such as the load transmission performance and the load dispersion performance can be further improved.

Hereinbelow, the operations of the vehicle-body structure 10 according to the second embodiment of the present invention having the above structure are explained with reference mainly to FIGS. 8A and 8B.

In the vehicle-body structure 10, the first extension 41 is joined to the first extended portion 32, the bulkhead 5 is arranged at a position below and overlapping the second extended portion 33. Therefore, the rigidity and the load transmission characteristic in the vehicle-width direction can be improved in comparison with the case where the extensions 4 are joined to both of the first extended portion 32 and the second extended portion 33.

In addition, because the outer side of the bulkhead 5 is joined to the side-sill outer 21, the load inputted into the vehicle body at collision is quickly transmitted through the bulk front wall 51 and the bulk rear wall 52 to the side-sill inner 22, the side-sill inner 9, and the vehicle-body floor 13 (illustrated in FIG. 8A). Therefore, the collision performance such as the load transmission performance can be improved.

On the other hand, because the inner side of the bulkhead 5 is arranged close to the side-sill inner 22 such that the gap δ exists between the side-sill inner 22 and the bulkhead 5, transmission of vibrations of the vehicle body from the side-sill inner 22 to the vehicle-body floor 13 can be avoided during vehicle running. Therefore, habitability and running stability can be improved. In addition, because the bulkhead 5 is joined to the side-sill outer 21 and is not joined to the side-sill inner 22, the assemblability of the side sill 2, which forms the closed cross section, can be improved.

As explained above, the vehicle-body structure 10 according to the second embodiment of the present invention enables rigidity designs which are flexibly adapted for the requirements of vehicle specifications and standards in destinations, ensures appropriate rigidity and strength with minimum necessary weight increase, and enables overall improvement of drivability, livability, fuel efficiency, and collision performance such as the load transmission performance.

Although the second embodiment of the present invention is explained as above, the present invention is not limited to the explained embodiments, and variations can be embodied as needed. For example, although, in the second embodiment, the first extension 41 is joined to the first extended portion 32 and the bulkhead 5 is arranged in the position below and overlapping the second extended portion 33, three or more extended portions and two or more bulkheads may be arranged.

Figure 9A:
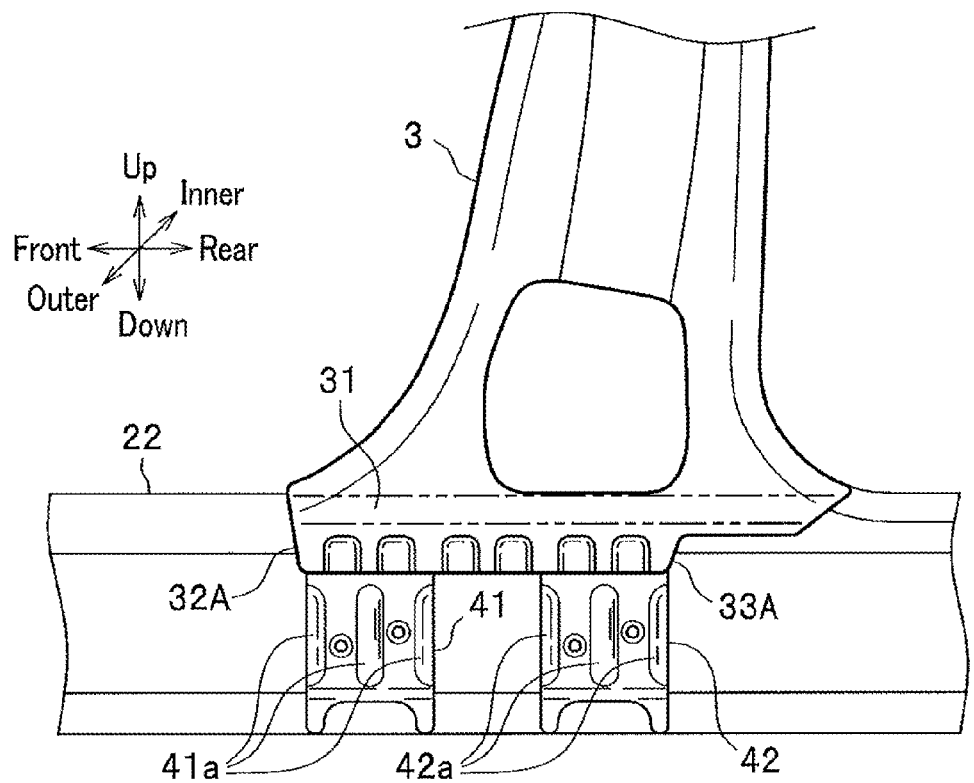
FIGS. 9A and 9B explain a situation of a junction of the extension in variations according to the present invention, where
Figure 9B:
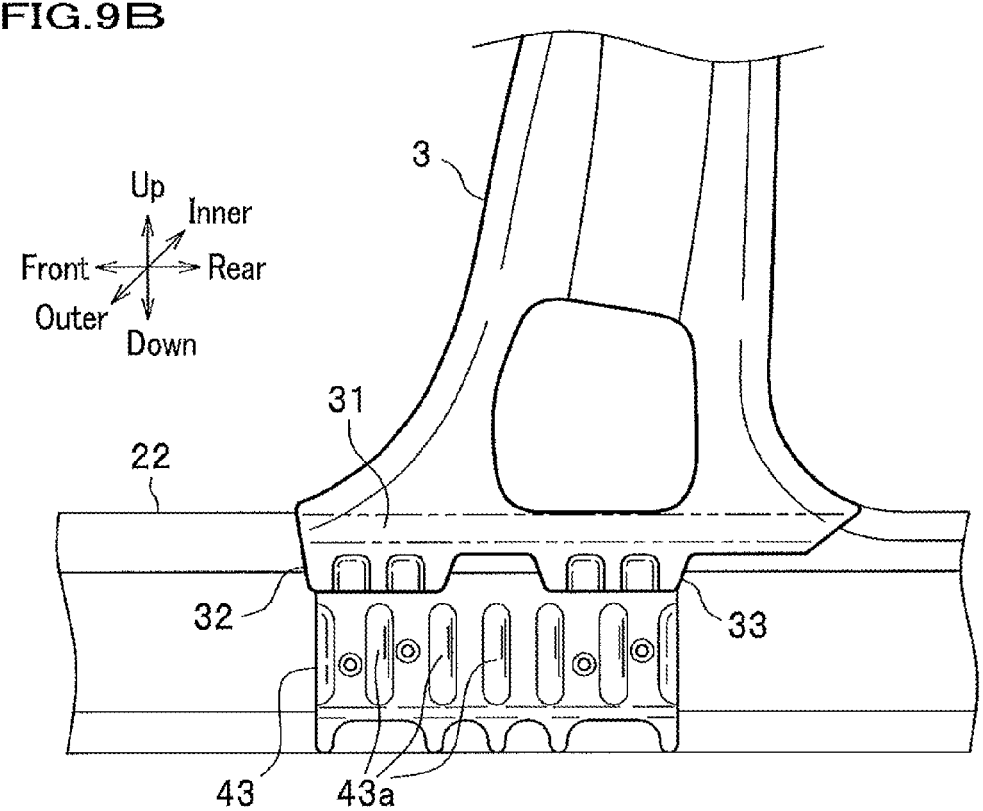

In addition, although, in the second embodiment, the first extended portion 32 and the second extended portion 33 are separately and discretely arranged, the first extended portion 32 and the second extended portion 33 may be arranged contiguously and integrally (as illustrated in FIG. 9A). Further, although, in the second embodiment, the first extension 41 is joined to the first extended portion 32 among the first extended portion 32 and the second extended portion 33 as illustrated in FIG. 5A, it is possible to arrange a single extension 43 to be joined to both of the first extended portion 32 and the second extended portion 33.

Although, in the second embodiment, the bulkhead 5 having the U-shaped cross section is arranged in the position below and overlapping the second extended portion 33, the arrangement of the bulkhead 5 is not limited to the manner of the second embodiment. For example, the shape of the bulkhead 5 is not limited to the U-shaped cross section, and the bulkhead 5 may have a block-like shape. Otherwise, the bulkhead 5 may be arranged in a horizontal position which does not overlap the second extended portion 33.

LIST OF REFERENCE SIGNS 1, 10: Vehicle-body Structure
2: Side Sill
3: Pillar Inner (Pillar)
4: Extension
5: Bulkhead
5A: Upper Joined Portion
5B: Lower Joined Portion
5C: Side Joined Portion
9: Cross Member
11: Front Pillar
12: Rear Wheelhouse
13: Vehicle-body Floor
21: Side-sill Outer
21a: Outer Upper Wall
21b: Outer Lower Wall
21c: Outer Side Wall
21d: Outer Upper Flange
21e: Outer Lower Flange
22: Side-sill Inner
22a: Inner Upper Wall 22b: Inner Lower Wall
22c: Inner Side Wall
22d: Inner Upper Flange
22e: Inner Lower Flange
30: Pillar Stiffener
31: Joined Portion
32: First Extended Portion
33: Second Extended Portion
41: Extension
41a: Bead
42: Extension
51: Bulk Front Wall
51a: Bulk-front-wall Lower Portion
51b: Forward-bent Portion
51c: Bulk-front-wall Upper Portion
52: Bulk Rear Wall
52a: Bulk-rear-wall Lower Portion
52b: Rearward-bent Portion
52c: Bulk-rear-wall Upper Portion
53: Bulk Side Wall
53a: Bead

The invention claimed is:

1. A vehicle body structure which includes,
a side sill extending on a side of a vehicle body in a front-rear direction, and
a pillar having a lower end joined to the side sill and extending upward;
wherein
the side sill comprises:
a side-sill outer which is formed, to have a hat-like cross section, by,
a pair of an outer upper wall and an outer lower wall which face each other,
an outer side wall which extends to outer ends, in a vehicle-width direction, of the outer upper wall and the outer lower wall,
an outer upper flange which extends upward from an inner end, in the vehicle-width direction, of the outer upper wall, and
an outer lower flange which extends downward from an inner end, in the vehicle-width direction, of the outer lower wall; and
a side-sill inner which is formed, to have a hat-like cross section, by,
a pair of an inner upper wall and an inner lower wall which face each other,
an inner side wall which extends to inner ends, in the vehicle-width direction, of the inner upper wall and the inner lower wall,
an inner upper flange which extends upward from an outer end, in the vehicle-width direction, of the inner upper wall, and
an inner lower flange which extends downward from an outer end, in the vehicle-width direction, of the inner lower wall;
wherein the outer upper flange and the inner upper flange are joined and the outer lower flange and the inner lower flange are joined so as to form a closed cross section;
the pillar comprises:
a joined portion located in a lower end portion of the pillar, and sandwiched and joined between the outer upper flange and the inner upper flange;
a first extended portion and a second extended portion which extend in the closed cross section of the side sill from the joined portion, and are arranged at a predetermined distance from each other in the front-rear direction; and
an extension which has an upper end joined to at least one of the first extended portion and the second extended portion, and a lower end sandwiched and joined between the outer lower flange and the inner lower flange.

2. The vehicle body structure according to claim 1, wherein the upper end of the extension is joined to the first extended portion and the second extended portion.

3. The vehicle body structure according to claim 1, wherein the extension is joined to one of the first extended portion and the second extended portion, and is not joined to another of the first extended portion and the second extended portion, and a bulkhead is arranged below the pillar to block the closed cross section; and the bulkhead is arranged to be joined to the side-sill outer and extend inward close to the side-sill inner in the vehicle-width direction.

4. The vehicle body structure according to claim 3, wherein the bulkhead is arranged in a position below and overlapping said another of the first extended portion and the second extended portion, and formed, to have a U-shaped cross section, by a pair of a bulk front wall and a bulk rear wall facing each other and a bulk side wall extending to inner ends of the bulk front wall and the bulk rear wall;
the bulk front wall includes a bulk-front-wall lower portion extending to the bulk side wall, a forward-bent portion extending upward from the bulk-front-wall lower portion and being bent forward, and a bulk-front-wall upper portion extending upward from the forward-bent portion;
the bulk rear wall includes a bulk-rear-wall lower portion extending to the bulk side wall, a rearward-bent portion extending upward from the bulk-rear-wall lower portion and being bent rearward, and a bulk-rear-wall upper portion extending upward from the rearward-bent portion; and
a distance between the bulk-front-wall upper portion and the bulk-rear-wall upper portion is greater than a distance between the bulk-front-wall lower portion and the bulk-rear-wall lower portion.

5. The vehicle body structure according to claim 3, wherein the bulkhead includes an upper joined portion which is joined to the outer upper wall, a lower joined portion which is joined to the outer lower wall, and a side joined portion which is joined to the outer side wall.

6. The vehicle body structure according to claim 4, wherein the bulkhead includes a bead which extends on the bulk side wall along the front-rear direction of the vehicle body.

7. The vehicle body structure according to claim 3, wherein the bulkhead is arranged to overlap with a cross member in a vehicle-width direction position, where the cross member supports a vehicle-body floor and extends in the vehicle-width direction.

8. The vehicle body structure according to claim 1, wherein the extension is a separate member from the side sill and the pillar, and is joined at the upper end to the at least one of the first extended portion and the second extended portion, and at the lower end by being sandwiched between the outer lower flange and the inner lower flange.

* * * * *